340-870.12 SR

OR 3,754,215

[redacted]

United States X 3075E

Blomenkamp X 3118N

[11] 3,754,215

[45] Aug. 21, 1973

[54] FREQUENCY-BURST-DURATION MODULATION AND FREQUENCY MULTIPLEXED DATA TRANSMISSION SYSTEM

[75] Inventor: Robert W. Blomenkamp, Palo Alto, Calif.

[73] Assignee: Physics International Company, San Leandro, Calif.

[22] Filed: Aug. 9, 1971

[21] Appl. No.: 169,988

[52] U.S. Cl............ 340/151, 329/106, 340/147 PC, 340/167 A, 340/171 A

[51] Int. Cl. ............................................ H04q 9/00

[58] Field of Search.......... 340/151, 171 R, 171 PF, 340/182, 183, 207; 325/47; 332/21, 40, 22; 179/15 BM

[56] References Cited

UNITED STATES PATENTS

| | | | |
|---|---|---|---|
| 3,210,747 | 10/1965 | Clynes | 340/206 |
| 3,518,628 | 6/1970 | Giel et al. | 340/167 |
| 3,614,721 | 10/1971 | Lagoe | 340/206 |

*Primary Examiner*—Donald J. Yusko
*Attorney*—Lindenberg, Freilich & Wasserman

[57] ABSTRACT

A system is disclosed for transmitting data to a control central from remote sensor stations, each station having a number of analog sensors. Once a given remote sensor station is addressed by control central emitting an unique tone, a plurality of unique tones are transmitted by the addressed station through a single channel, one tone for each sensor, each tone being transmitted for a period proportional to the amplitude of an output signal from an unique sensor. All tone generators of the addressed station are turned on simultaneously with the trailing edge of the address tone. This trailing edge also activates a pulse generator the period of which determines the time period of the full scale output of each unique sensor tone. The time period of the pulse generator may be controlled by control central issuing a synchronizing tone or independently controlled at each remote station. The output of the pulse generator is integrated to produce a ramp signal. When the instantaneous value of the ramp signal equals the output signals of a given sensor, its associated tone generator is turned off.

17 Claims, 15 Drawing Figures

INVENTOR.
ROBERT W. BLOMENSKAMP
BY
Lindenberg, Freilich & Wasserman
ATTORNEYS

ROBERT W. BLOMENKAMP
INVENTOR.

BY

Lindenberg, Freilich & Wasserman
ATTORNEYS

PATENTED AUG 21 1973

3,754,215

INVENTOR.
ROBERT W. BLOMENKAMP
BY
Lindenberg, Freilich & Wasserman
ATTORNEYS

INVENTOR.
ROBERT W. BLOMENKAMP
BY
Lindenberg, Freilich & Wasserman
ATTORNEY

ROBERT W. BLOMENKAMP
INVENTOR.

BY

Lindenberg, Freilich & Wasserman
ATTORNEYS

INVENTOR.
ROBERT W. BLOMENKAMP
BY
Lindenberg, Freilich & Wasserman
ATTORNEYS

INVENTOR.
ROBERT W. BLOMENKAMP
BY
Lindenberg, Freilich & Wasserman
ATTORNEYS

PATENTED AUG 21 1973 3,754,215

SHEET 8 OF 9

ROBERT W. BLOMENKAMP
INVENTOR.

BY

Lindenberg, Freilich & Wasserman
ATTORNEYS

PATENTED AUG 21 1973 3,754,215

SHEET 9 OF 9

INVENTOR.
ROBERT W. BLOMENKAMP
BY
Lindenberg, Freilich & Wasserman
ATTORNEYS

FREQUENCY-BURST-DURATION MODULATION AND FREQUENCY MULTIPLEXED DATA TRANSMISSION SYSTEM

BACKGROUND OF THE INVENTION

This invention relates to a frequency division multiplex communications system for transmitting analog data from a plurality of sensors at one or more remote sensor stations to a control central, and more particularly to a system for frequency-burst-duration modulating a plurality of unique tones being transmitted over a single channel such as a pair of wires, or a single common telephone circuit, in response to output signals from corresponding unique sensors.

There is a continuing and growing need for data links that transmit information via FTS grade telephone lines or other type of communications channel of wide band width from remote sensor stations to a central data processing station (called control central), either in response to an interrogating signal from the control central or in response to a manually initiated signal at the remote sensor station. For standard voice-quality telephone lines, the number M of frequency bands allowable is 16, with 170 Hz band separation. Accordingly, data from up to fifteen sensors may be transmitted simultaneously from one station by frequency multiplexing, with one channel reserved for a synchronizing signal if desired. In the case of 120 Hz band separation, 25 bands are allowed. Accordingly, data from 24 sensors may be transmitted simultaneously from one sensor station, reserving one band for transmitting a synchronizing signal.

There may be a maximum number N of remote sensor stations, depending upon the interrogating interval. For example, a conservative maximum N is 60 if the interrogating interval is 1 hour. That allows 1 minute to address each remote station, interrogate the maximum number M of sensors, and process or record the data. It is evident the number of remote sensor stations that can be interrogated per unit time depends on the time required to receive, hold, format and transmit the data from the sensors to the control central for indicating, recording and/or other processing, and for retransmitting the data to remote recording, or indicating stations.

If the remote sensor stations are to be interrogated cyclically, all of the available time cannot be appropriated for that because some time must be reserved for on-demand data transmissions, particularly if the interval is long. Accordingly, the time to receive and respond to an interrogation must be minimized for use of the system in servicing a maximum number of remote sensor stations.

In the past, frequency division multiplexing has been used to accommodate a plurality of channels. Various distinct modes of modulation have been used for the separate channels, including pulse width or pulse duration modulation. For transmission of analog data using a given tone, a circuit is employed to convert the amplitude of the analog signal to a pulse of proportional duration. The pulse is then applied to a suitable modulator for altering the amplitude of the tone signal for the duration of the pulse. This sequence of converting amplitude to pulse duration, and then modulating a tone may not increase the total time required significantly, but will add to the complexity of the system as compared to a system which simultaneously converts amplitude of an output signal from a sensor to modulation of a tone of proportional, duration, i.e., which provides pulse duration modulation of a tone while the conversion from amplitude to pulse duration is taking place. This conversion and modulation must, of course, take place simultaneously for all tones to be transmitted over the same channel at the same time.

SUMMARY OF THE INVENTION

An object of this invention is to provide apparatus for simultaneous conversion of analog signal amplitude to frequency-burst-duration modulation of a tone.

Another object is to provide apparatus for simultaneous conversion of amplitude to frequency-burst-duration modulation of a plurality of tones in order to transmit analog data from a plurality of sensors at the same time over a single channel.

Another object is to provide apparatus for demodulation of a frequency-burst-duration modulation tone to the equivalent analog signal.

Still another object is to provide apparatus for simultaneous demodulation of a plurality of frequency-burst-duration modulated tones to the equivalent analog signals in order to transmit analog data from a plurality of sensors at the same time over a single channel.

Still another object is to provide an improved system for transmission of analog data from remote sensor stations to a central control station.

These and other objects of the invention are achieved by a system for transmitting data to a control central from a given remote sensor station in frequency-burst-duration modulated and frequency-multiplexed form. An address tone transmitted by the control central through a communication channel common to all remote sensor stations is filtered and detected to activate a square-wave generating means that provides a data-period square wave. The leading edge of the data-period square wave thus generated turns on a plurality of tone-generating means simultaneously, a unique tone-generating means being associated with each different one of a plurality of sensors at the remote station. At the same time integration means receives the data-period square wave and transmits a linear ramp signal to a plurality of comparing means, one for each sensor. When the analog signal from a given sensor is equal to the ramp signal, it turns off the tone-generating means associated with that sensor. In that manner a plurality of tones are transmitted, each beginning at the same time and continuing for a period which is directly proportional to the amplitude of the analog signal from an associated sensor. When the trailing edge of the data-period square wave occurs, all analog signals from sensors will have been equalled, so all sensor tone-generating means are turned off and a station-identifying, tone-generating means is turned on for a predetermined period to signal to the control central that the remote sensor station addressed has responded, and that therefore another remote sensor station can now be addressed.

Local timing of the data-period square-wave generating means can be set to accomodate the maximum analog anticipated at that sensor sation, or set for the maximum signal anticipated from any sensor at any station. Alternatively, the data-period square-wave generating means can be set to run until reset by a tone signal from the control central, at which time the station-identifying, square-wave generating means is turned on for a preset time.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 14 is a time chart of events occuring in sequence at a remote sensor station and a control central for a single data transmission.

DESCRIPTION OF THE PREFERRED EMBODIMENTS

Figure 1:
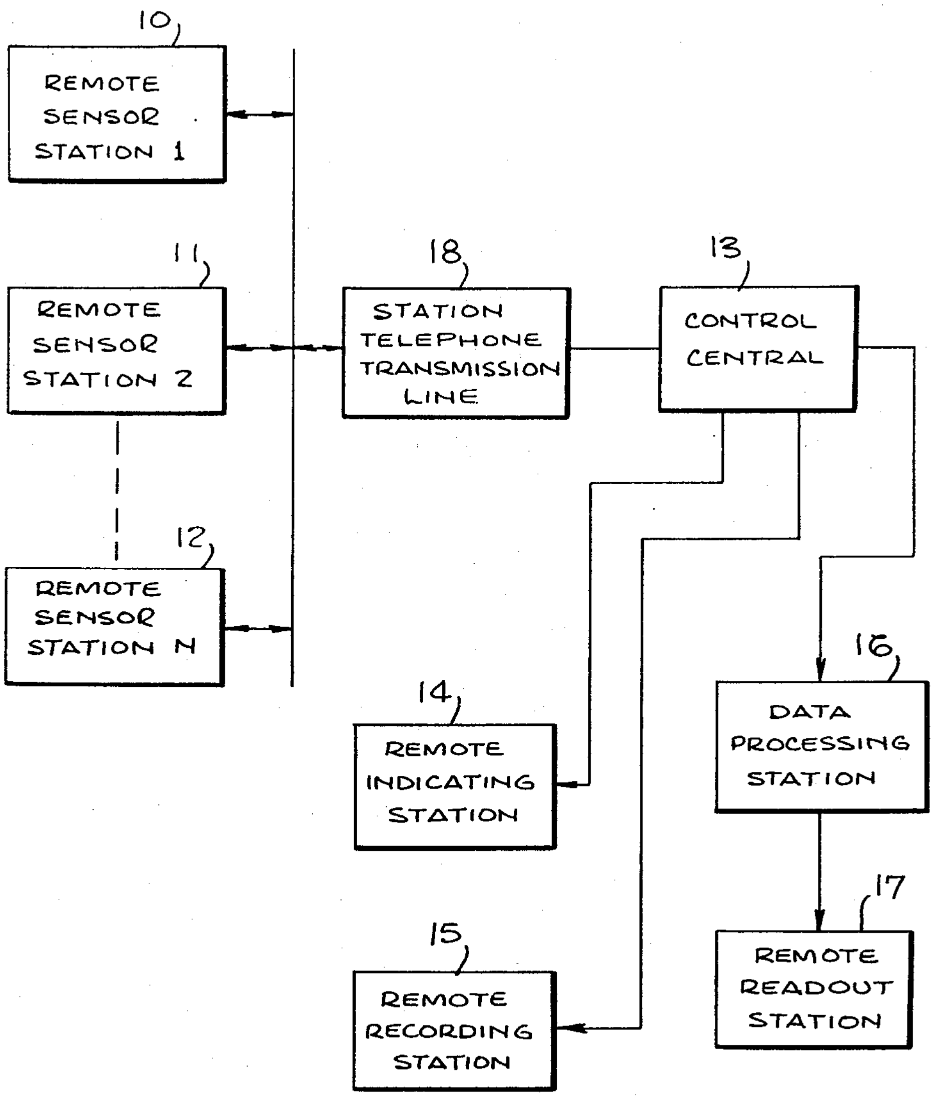
FIG. 1 is a block diagram of a data transmission system embodying the present invention.

The frequency-burst-duration modulation system of the present invention forms a frequency-multiplexed data link that transmits information by FTS grade telephone lines from remote sensor stations, such as stations 10, 11, and 12 to a control central 13 and then to a remote indicating, recording, and data processing stations such as respective stations 14, 15 and 16. The data processing station 16 may include a remote readout station 17 which is independent of the data processing station 16. The system is capable of interrogating a number N of stations in a predetermined or programmed sequence through a single channel 18, such as a telephone circuit. At each remote sensor station, the control central can simultaneously interrogate a number M of sensors. The data from each sensor is transmitted to the control central as a duration modulated tone.

The maximum number M of sensors which may be interrogated at a given remote sensor station depends on the allowable number of frequency bands of the transmission channel. For standard voice quality transmission telephone lines, the maximum number of sensors at a single remote sensor station is limited to 15 for a band spacing of 170 Hz, while the maximum number of sensors is limited to 24 for a band spacing of 120 Hz, if one additional band is reserved for transmitting a synchronizing signal. The maximum number N of remote sensor stations which may be interrogated depends upon the interrogating time interval. For example, a conservative maximum number of remote stations is 60, if the interrogating interval is 1 hour. That allows an average of 1 minute per remote sensor station. If the interrogating interval is increased, the number N increases correspondingly, i.e., if the interrogating interval is increased to 2 hours, then the maximum number is 120. The total number of sensors which can be interrogated is thus NM.

It should be noted that although reference is made to telephone lines in the preferred embodiment of the present invention, other types of communication channels of wide band width may be employed. If the communication channel selected has an allowable number of frequency bands greater, or less, than the telephone lines contemplated, the maximum number of sensors at a given remote sensor station would be adjusted accordingly.

The number of remote sensor stations interrogated per unit time depends on the time required to receive, hold and reformat the data from a remote sensor station and for the control central to transmit the data to the remote indicating, recording and data processing stations, plus the time required to answer on-demand data transmissions. Since the largest part of the time is devoted to transmitting data from the control central to the remote recording, indicating and data processing stations, user requirements will influence the maximum number of remote sensor stations that may be accommodated, more so than any other parameter. For example, assume that the data processing station will accept only binary-coded-decimal (BCD) format and that on-demand data transmissions will be subordinate to routine data transmissions. That will require accepting frequency-burst-duration modulated data from a remote sensor station and converting it to the BCD format. In addition, it will require allowing some free time in the sequencing or programming of the interrogation of remote sensor stations so as to allow on-demand data transmissions to be initiated from the control central, or from a remote indicating/recording station without overrunning the period allowed for one sequence of interrogations. Since the user requirements will vary greatly, it is important to provide, for each remote sensor station, a system of frequency-burst-duration modulation and frequency multiplexing which requires a minimum of time for transmission of data from all sensors, thereby allowing a maximum of data processing time for flexibility in sequencing or programming the control central.

Each remote sensor station implemented in accordance with the present invention is assumed to include all of the sensors and the scalor electronics required to provide for each sensor a standard analog output in volts. Each remote sensor station also includes the transmitting and receiving circuits required to uniquely identify the station and transmit the data as duration-modulated, frequency-multiplexed tone signals.

The control central is assumed to contain a sequencer or programmer that initiates and controls the interrogation of the remote sensor stations, in addition to demultiplexing equipment, equipment for converting the duration modulated tone signals to a suitable format, such as BCD, a buffer memory, and equipment for transmitting the data received from a remote sensor station sequentially to the remote indicating/recording and data processing stations as required. These stations are operated by the user of the system and will generally contain a dataphone, a data receiver and the interface to whichever recording/indicating or data processing mode is desired by the user.

Operation of the system shown in FIG. 1 begins with a positive-address tone pulse transmitted by the control central. Since the tone pulse is unique to the remote sensor station being addressed, it activates only that station's data transmission system shown in FIG. 2. Following the data period pulse by a predetermined time interval, the remote sensor station is deactivated either automatically in a manner to be described by way of example, and not by way of limitation, or in response to another tone pulse from the control central. The time interval may be, for example, one second. That is determined by the time-domain analog of each sensor's full scale voltage output.

A plurality of address tone pulses may be transmitted according to a predetermined code by the control central in some applications to uniquely identify a single remote station, such as when the number N of stations is large. The tones transmitted may then be detected and decoded to activate only one remote station. For example as many as 6 tones may be employed to address one out of 64 remote stations. However, in the exemplary embodiment to be described, only one tone is transmitted at a given time to address a remote station.

After transmitting the analog data, the addressed remote sensor station transmits its own address tone to signal to the control central it has responded and has completed transmission. The control central then compares the tone received from the remote sensor station, and if it agrees with the one it sent out, it validates the received data. The control central demultiplexes and reformats the data and transmits it to the remote indicating recording and data processing stations before calling the next remote sensor station in the predetermined or programmed sequence. The process is then repeated with the next remote sensor station.

Many options can be added to the control central, such as an automatic alarm to indicate the failure of any sensor or remote sensor station due to lack of a received signal, or an alert system to indicate when the output of a sensor, or combination of sensors, is outside present maximum and/or minimum levels. Such an alert system could indicate, for example, when a particular sensor exceeds an allowable limit. However, regardless of any alarm condition, the system would not interrupt its interrogating process.

Figure 2:
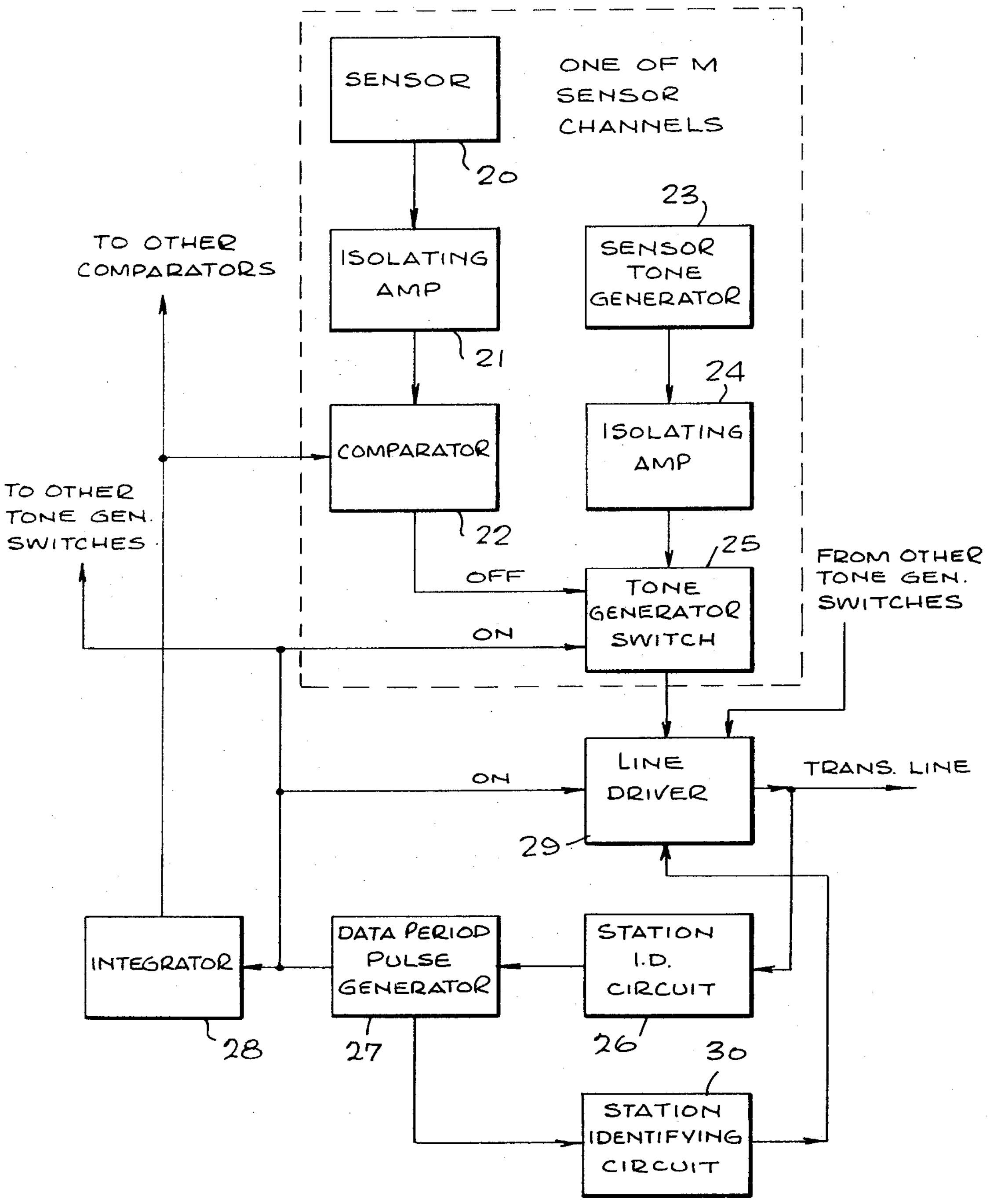
FIG. 2 is a block diagram of a remote sensor station of the system of FIG. 1.

The operation of a remote sensor station will now be described with reference to FIG. 2. To simplify explanation, only one sensor 20 is shown together with its sensor isolating amplifier 21, comparator 22, tone generator 23, tone generator isolating amplifier 24 and tone generator switch 25. It should be understood that other sensors would be provided in a remote sensor station with its own set of circuits corresponding to the circuits 21 to 25 shown for the sensor 20, and enclosed by a dotted line box.

When the control central transmits a positive tone pulse or a plurality of tone pulses for the particular remote sensor station illustrated, the station receives it and responds to it through a station identification circuit 26 which activates a pulse generator 27. The pulse generator produces a square wave, the leading edge of which turns on the tone generator switch 25 allowing the transmission of a tone from the generator 23 which is unique to the sensor 20, and the corresponding tone generator switches of other tone generators associated with the other sensors at the same station.

The square wave from the pulse generator 27 is integrated by a circuit 28 to provide a ramp signal to the comparator 22. The comparator receives the analog output signal from the sensor 20 via the isolating amplifier 21 and compares it with the ramp signal. When the instantaneous voltage of the ramp signal is equal to the analog signal from the sensor 20, the comparator 22 produces a signal that turns off the tone generator switch 25. In that manner, a tone signal is transmitted through a line driver 29 (common to all other tone generators for other sensors of the station not shown), and the tone transmitted for the sensor 20 will have a duration which is directly proportional to the amplitude of the analog signal from the sensor 20. Thus frequency-burst-duration modulation is initiated by the pulse generator 27 for all sensors of the remote station through the various tone generator switches. In other words, a plurality of sensors are connected to a corresponding number of comparators which control the same number of tone generating switches for the purpose of connecting a plurality of tone generators with the line driver, one tone generator for each sensor.

Figures 3, 4, 5:
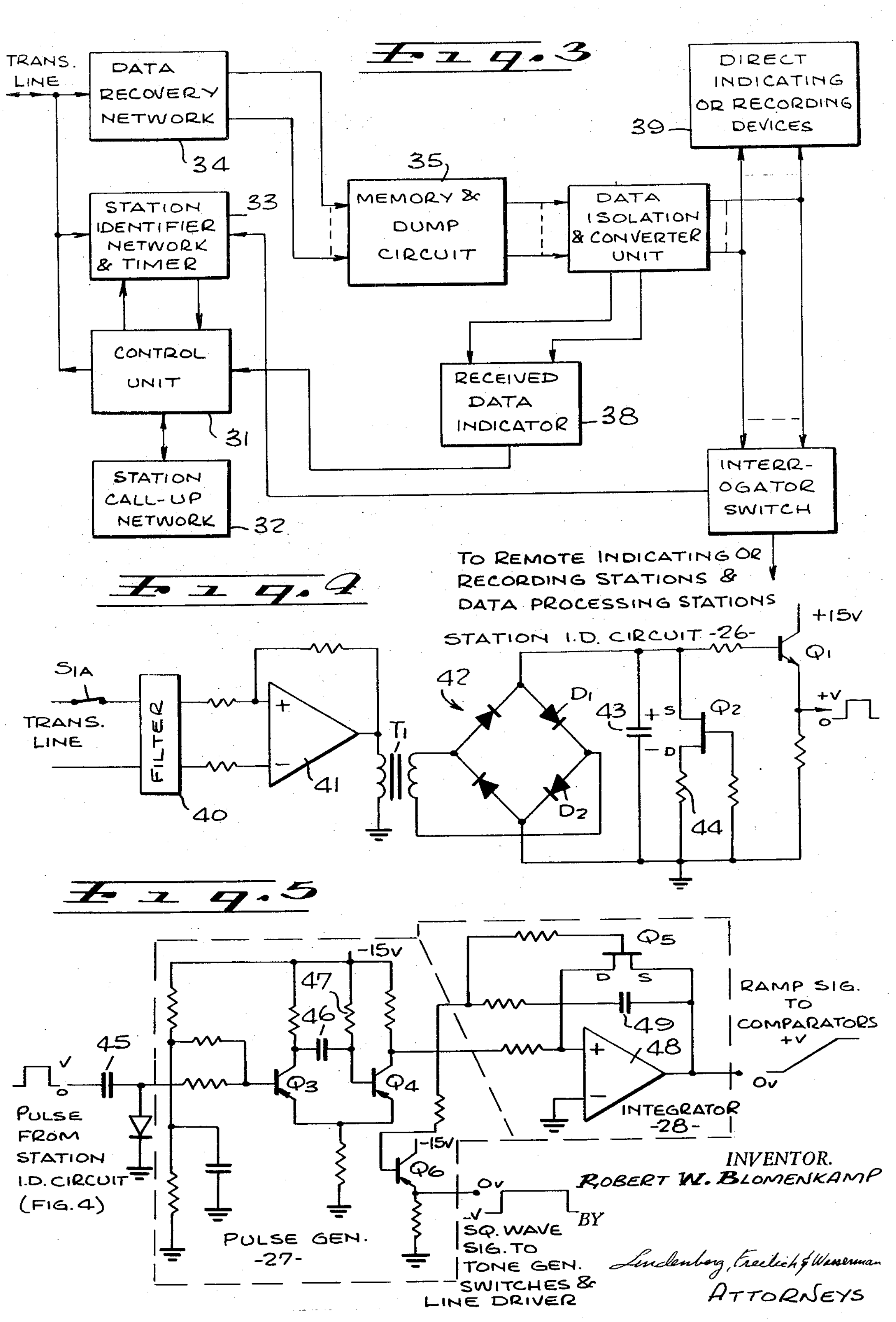
FIG. 3 is a block diagram of an exemplary control central for the system of FIG. 1.
FIG. 4 is a circuit diagram of a station identification circuit for a remote sensor station.
FIG. 5 is a circuit diagram for a pulse generator and integrator of a remote sensor station.

When the data-period pulse from the generator 27 terminates, it causes a station identifying tone circuit 30 to transmit over the transmission line the same tone (or tones) used in addressing the remote sensor station. That station identifying tone is transmitted for a very short period of time, such as 200 milliseconds. Thus, in the embodiment to be described in greater detail, the station identifying circuit 26 starts a pulse generator that, after a given period, deactivates or turns off all tone generator switches not already turned off by a comparator output, and initiates the transmission of a station identifying tone. However, it should be noted that deactivation of the data period pulse generator and activation of the station identifying tone circuit may be controlled by the control central with a synchronizing tone pulse, rather than having it controlled locally by an RC timing circuit in the pulse generator 27, in a manner to be described hereinafter with reference to FIG. 15. Thus, in some systems where extreme accuracy is required, and severe environmental conditions would tend to alter the parameters of the RC timing circuits at the remote stations, it would be advantageous to avoid using RC timing circuits at the remote stations, and to control the data pulse period generator at the remote sensor stations with a synchronizing tone from control central. However, to simplify explanation of an exemplary embodiment of a remote sensor station with reference to FIGS. 4 to 9, it is assumed that the data period pulse generator 27 shown in FIG. 5 is turned on by the central control with a station address tone via the station identification circuit shown in FIG. 4, and that the data period pulse generator then automatically terminates frequency-burst-duration modulation and frequency-multiplex transmission after a period established by a simple RC circuit.

One advantage of employing an RC timing circuit in the pulse generator for local turnoff control is that implementation of the control central can then be simplified to one which advances to the next remote sensor station to be interrogated only upon receipt of a station identifying tone from a previously addressed remote sensor station. In order that the control central not hang up at one remote sensor station should the station identifying tone fail, the control station could then be provided with an RC timing circuit to force an advance to the next station after the lapse of some maximum time to be alloted for each remote sensor station. The RC timing circuit in each remote sensor station can be adjusted locally to the maximum period required for transmission of an analog signal.

Before proceeding with a description of the circuits in FIGS. 4 through 9 for a remote sensor station, the organization and operation of an exemplary control central will be described with reference to FIG. 3. The hub of the central control is a control unit 31 which contains a clock that provides a start signal to a programmer within the control unit at predetermined interrogation times. The programmer will usually be established as part of the system software in order that it be easily and inexpensively changed.

The programmer operates from the control unit to produce the following events for each interrogation command, whether the interrogation be automatically or manually initiated:

1. Activate a call-up oscillator network 32 to provide a unique address tone for the next station to be interrogated.

2. Transmit a remote sensor station address tone (or plurality of tones) over the transmission line.

3. Select proper filter and logic circuits for the proper remote sensor station address identifier in network 33 and simultaneously select a proper remote sensor station address identifier timer 32B to produce an address identifier square wave transmitted to an unique AND gate in the station address identifier network 33. This timer will be set for a period that will exceed the time necessary for the station identifying tone to be received from the remote sensor station.

4. When the remote station identifying signal is received in the station address identifer, a square wave signal generating means energizes the second terminal of the unique AND gate. With both signals present, the AND gate turns on, and a signal is transmitted thereby to the control unit 31 to initiate the next step. If no station identifying signal is received, an alarm is sounded to indicate that the station is not working and the next step is not initiated. If desired, the alarm system may include a lamp on a panel indicating which remote stations have failed.

5. The programmer in the control unit is held for a preset time interval (typically 0.2 seconds) after the fourth step has been initiated, and if within this time a signal is not received from the station identifier, an alarm idicates that the station has failed to properly identify itself so that the data received through a data recovery network unit 34 is dumped from a memory unit 35. In addition, the control unit skips the next two steps. If the signal from the station identifier is received within the preset time, the next step is initiated.

6. A signal is transmitted by the control unit. The control unit then holds position until a "complete" signal is received from an interrogator switch 36, i.e., until the interrogator switch returns to origin. Once the interrogator switch unit has been cycled to sequence the data from the memory unit 35 through a data isolation and converter unit 37 for transmission to remote indicating, recording, and data processing units in sequence, it issues a complete signal to the control unit 31 and a "dump" signal to the memory unit 35. In some systems it may be advantageous, due to a long time period (perhaps hours) to dump the memory during the call up signal time just prior to receiving the data from the remote sensor station. This could be accomplished by the control unit 31 programmer transmitting a signal simultaneously with (1) to the dump memory circuit.

7. In the next step, the memory is dumped and then the steps 1 through 7 are repeated for another remote sensor station address. Upon receipt of a signal through the station identifier from the last remote sensor stations interrogated, the control unit 31 resets itself.

An indicator 38 may be provided to monitor the data isolation and converter unit to indicate to the control unit that data has been received and transferred to remote indicating or recording stations. In addition a bank 39 of direct indicating or recording deVices may be provided at the control central.

The circuits for a remote sensor station servicing just one sensor by way of example will now be deScribed. Referring first to FIG. 4, a station address tone pulse is received through a filter 40 tuned to the frequency of the address tone for the particular station. The output of the filter is amplified by a differential amplifier 41 having negative feedback. The amplifier output is AC coupled by a transformer $T_1$, rectified by a diode bridge 42 and filtered by a capacitor 43. The positive end of the filter capacitor is connected to the base of an NPN transistor $Q_1$ to produce a positive output pulse at the emitter of that transistor. When the tone pulse ends, a field-effect (N-channel) transistor $Q_2$ is turned on, thus discharging the filter capacitor and turning off the transistor $Q_1$.

The unique combination of circuit elements including the field-effect transistor $Q_2$ has an avalanche effect on the discharge current for that provides the formation of a well defined DC pulse the duration of which is established by the time duration of the frequency burst of the original tone. This is because the capacitor 43 charges very quickly to drive the transistor $Q_1$ on to saturation at the onset of the frequency burst. At the end of that burst, the capacitor 43 will immediately start to discharge through diodes $D_1$ and $D_2$, thus depriving the transistor $Q_1$ of base current to turn it off. As the capacitor discharges, the forward bias on the diodes decreases. That would decrease the discharge current, resulting in an exponential discharge of the capacitor 43, but for the offsetting effect of the field-effect transistor $Q_2$ which begins to conduct increasingly more as the capacitor discharges. In other words, when a tone burst is received, the capacitor quickly charges, thereby increasing the reverse bias voltage $V_{GS}$ to the pinch-off level. The base current of the transistor $Q_1$ is then the only discharge path for the capacitor. When the tone burst stops, the diodes $D_1$ and $D_2$ conduct to start a rapid discharge of the capacitor. Very soon the capacitor will discharge sufficiently for the field-effect transistor $Q_2$ to conduct, and as the source voltage decreases toward the fixed 0-volt bias of the gate, the current through the N-channel of the transistor $Q_2$ increases, thus enhancing the discharge of N capacitor for a more nearly linear discharge at a high rate in place of an exponential discharge. If a rectifier is used which does not provide a substantial initial discharge of the capacitor, a large resistor may be connected, in parallel with the capacitor. From this analysis it is evident that an MOS type of field-effect transistor may be used instead since operation does not depend upon any gate current.

The positive pulse from the transistor $Q_1$ in the station identification circuit is coupled to the pulse generator 27 through a capacitor 45 shown in FIG. 5. The pulse generator is comprised of transistors $Q_3$ and $Q_4$ connected by a capacitor 46 to form a conventional monostable multivibrator. The transistor $Q_3$ is normally off while the transistor $Q_4$ is conducting. The negative-going trailing edge of the pulse from the station identification circuit turns the transistor $Q_3$ on. That in turn turns the transistor $Q_4$ off for the timing period of the capacitor 46, i.e., for the RC timing period of the capacitor 46 and resistor 47. While the transistor $Q_4$ is off, a negative signal of a stable level is integrated by an operational amplifier 48 having a feedback capacitor 49. In that manner, a ramp signal is produced at the output terminal of the amplifier 48.

The summing junction of the operational amplifier 48 is connected to the gate of a field-effect transistor $Q_5$ (type 2N4222) and the base of a PNP transistor $Q_6$. When the RC timing period of the pulse generator 27 has lapsed, the output terminal of the pulse generator applies a less negative signal (approximately −1.5 Volts) to the operational amplifier 48, thereby causing the summing junction to go negative from approximately 0 to −1.5 Volts. That turns the transistor $Q_5$ on to discharge the integrating capacitor 49.

While the transistor $Q_4$ is off during the RC timing period of the pulse generator 27, the transistor $Q_6$ is turned on to produce at the emitter a negative signal which turns all tone generator switches on for the duration of the RC timing period of the pulse generator 27, unless sooner turned off by associated comparators.

Figures 6, 7:
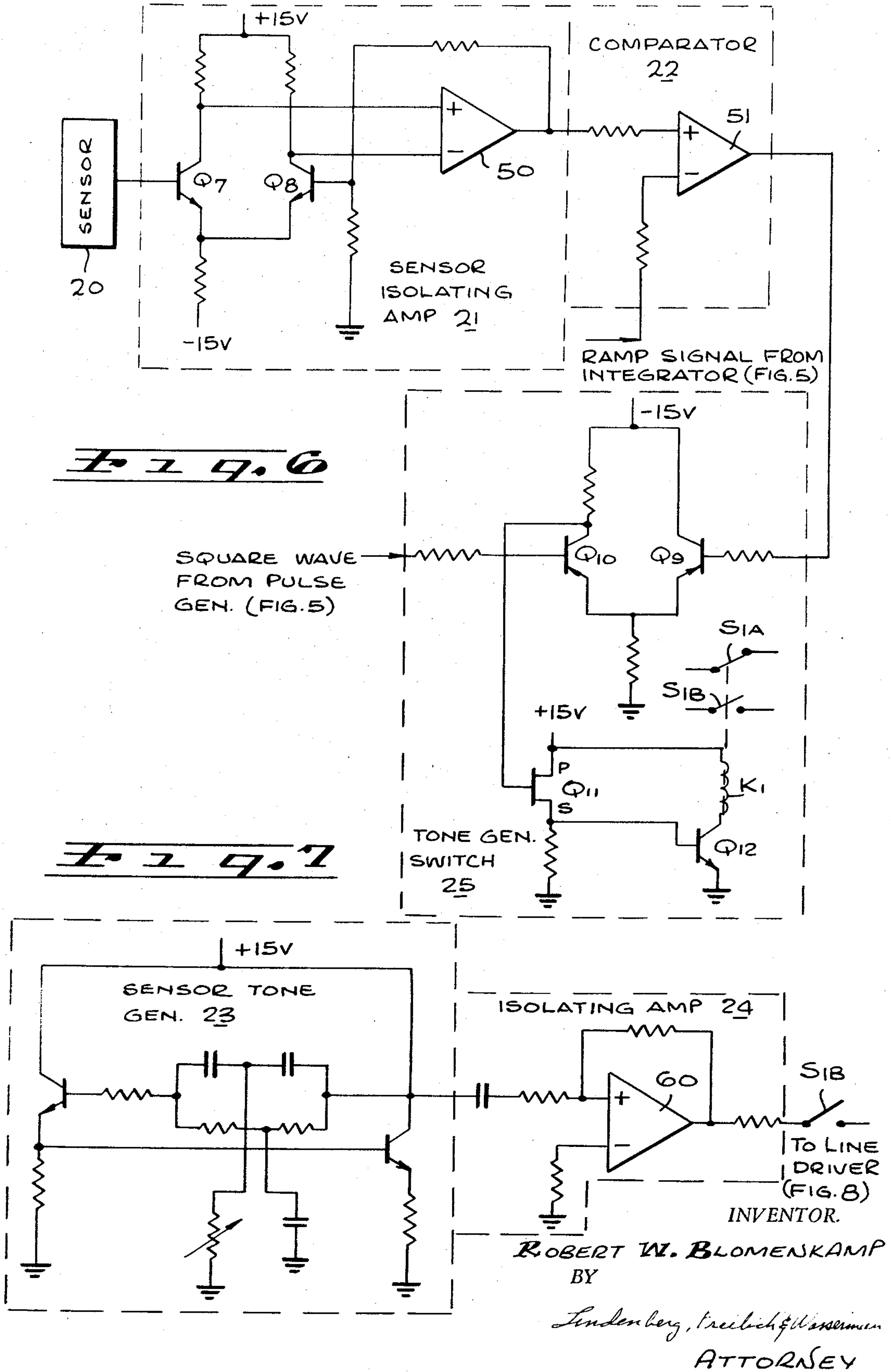
FIG. 6 is a circuit diagram of an isolating amplifier, comparator and tone generator switch for one of a plurality of sensors in a remote sensor station.
FIG. 7 is a circuit diagram of a tone-generator and isolating amplifier for a sensor in a remote sensor station.

Referring now to FIG. 6, the output of the sensor 20 is applied to the base of a transistor $Q_7$ which together with a transistor $Q_8$ forms a differential amplifier as the input stage of the isolating amplifier 21 for common mode rejection. A high-gain differential amplifier 50 connected to the input stage as shown completes the isolating amplifier circuit 21.

The output of the isolating amplifier 21 is connected to a high-gain differential amplifier 51 which functions as a comparator by transmitting a positive output signal until the data signal from the isolating amplifier 21 is equal to the ramp signal from the integrator 28 (FIG. 5). At that time a transistor $Q_9$ in the tone generator switch is turned on thereby turning off transistors $Q_{10}$, $Q_{11}$ and $Q_{12}$. Until then, the pulse generator output signal from the transistor $Q_6$ (FIG. 5) wil hold the transistor $Q_{12}$ on via transistor $Q_{10}$ and $Q_{11}$ to provide current through a relay K1. While the coil or solenoid is energized, it closes a switch $S_{1B}$ shown in FIG. 7 to couple a tone signal from the tone generator 23 (a free running oscillator) to the line driver 29 shown in FIG. 8 via the isolating amplifier 24 comprised of a differential amplifier 60 (FIG. 7) with feedback connected as shown. At the same time, a switch $S_{1A}$ is opened to disconnect the transmission line from the filter 40, FIG. 4, thereby disconnecting the station identification circuit.

Figures 8, 9:
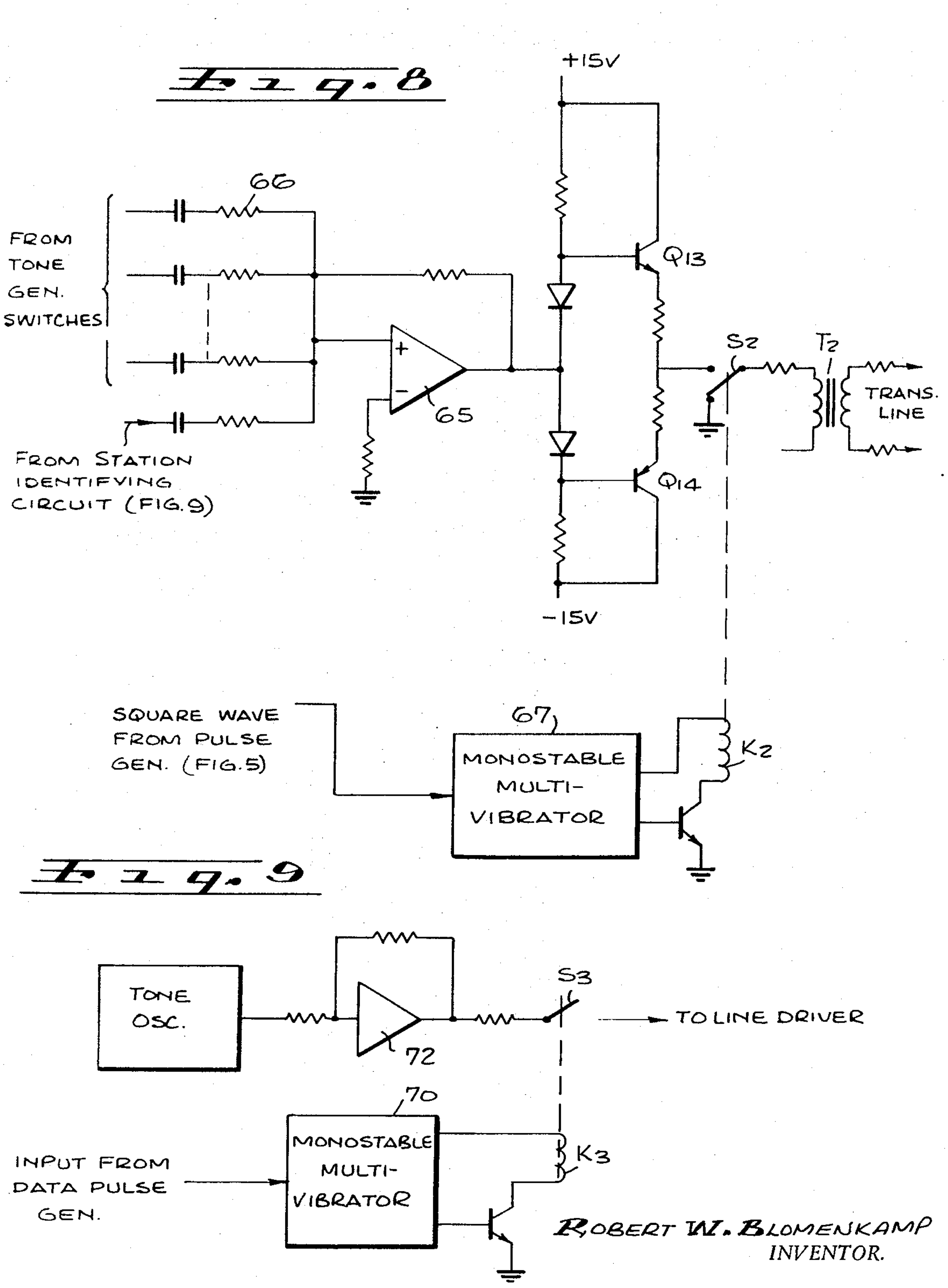
FIG. 8 is a circuit diagram for a line driver in a remote sensor station.
FIG. 9 is a circuit diagram of a station-identifying tone-generating circuit for a remote sensor station.

The circuit of the line driver shown in FIG. 8 is comprised of a differential amplifier 65 functioning as an operational summing amplifier having a plurality of input resistors connected to the summing junction. Each tone generator of the remote sensor station and the output of the station identification circuit (FIG. 9) is connected to a different one of the resistors, such as the tone generator 23 connected to a resistor 66 through the isolating amplifier 24. The output of the amplifier 65 is connected to a push-pull amplifier comprised of transistors $Q_{13}$ and $Q_{14}$. The output of the push-pull amplifier is connected to the primary of an output transformer $T_1$ having its secondary winding connected to the telephone transmission line.

The output of push-pull amplifier is connected to the transformer $T_2$ by a relay switch $S_2$ held closed by a monostable multivibrator 67 which is triggered by the leading edge of the output pulse from the pulse generator 27 (FIG. 5). The period of the monostable multivibrator 66 is set slightly longer (by about 0.2 sec.) than the period of the pulse from the pulse generator 27 so that once the maximum transmission time has expired, the push-pull amplifier of the line driver is disconnected from the transformer $T_2$. This is for the purpose of preventing any signals on the telephone transmission line from being coupled through the transformer $T_2$ to the emitters of the transistors $Q_{13}$ and $Q_{14}$. Accordingly, the monostable multivibrator 67 functions as a station-on-line timer.

The trailing edge of the pulse from the generator 27 triggers a monostable multivibrator 70 shown in FIG. 9 to close a relay switch $S_3$. While the switch $S_3$ is closed for a period of about 0.2 seconds, a station identifying tone from an oscillator 71 is transmitted to a high gain differential amplifier 72 functioning as an operational amplifier to the line driver via a summing resistor 73 shown in FIG. 8. The period of the monostable multivibrator 67 of the line driver shown in FIG. 8 is approximately 0.2 seconds longer than the period of the pulse generator 27 in order that once transmission of data tones has terminated, a station identifying tone can be transmitted from the free running oscillator 71. When the period of the monostable multivibrator 70 has expired, transmission of the station identifying tone terminates, and thereafter the switch $S_2$ is opened at the end of the timing period of the monostable multivibrator 67 in the line driver.

Exemplary circuits for the control central will now be described with reference to servicing the one remote sensor station. The manner in which additional sensor stations can be accomodated will be evident. Therefore, it is to be understood that the description which follows is by way of example and not limitation.

Figure 15:
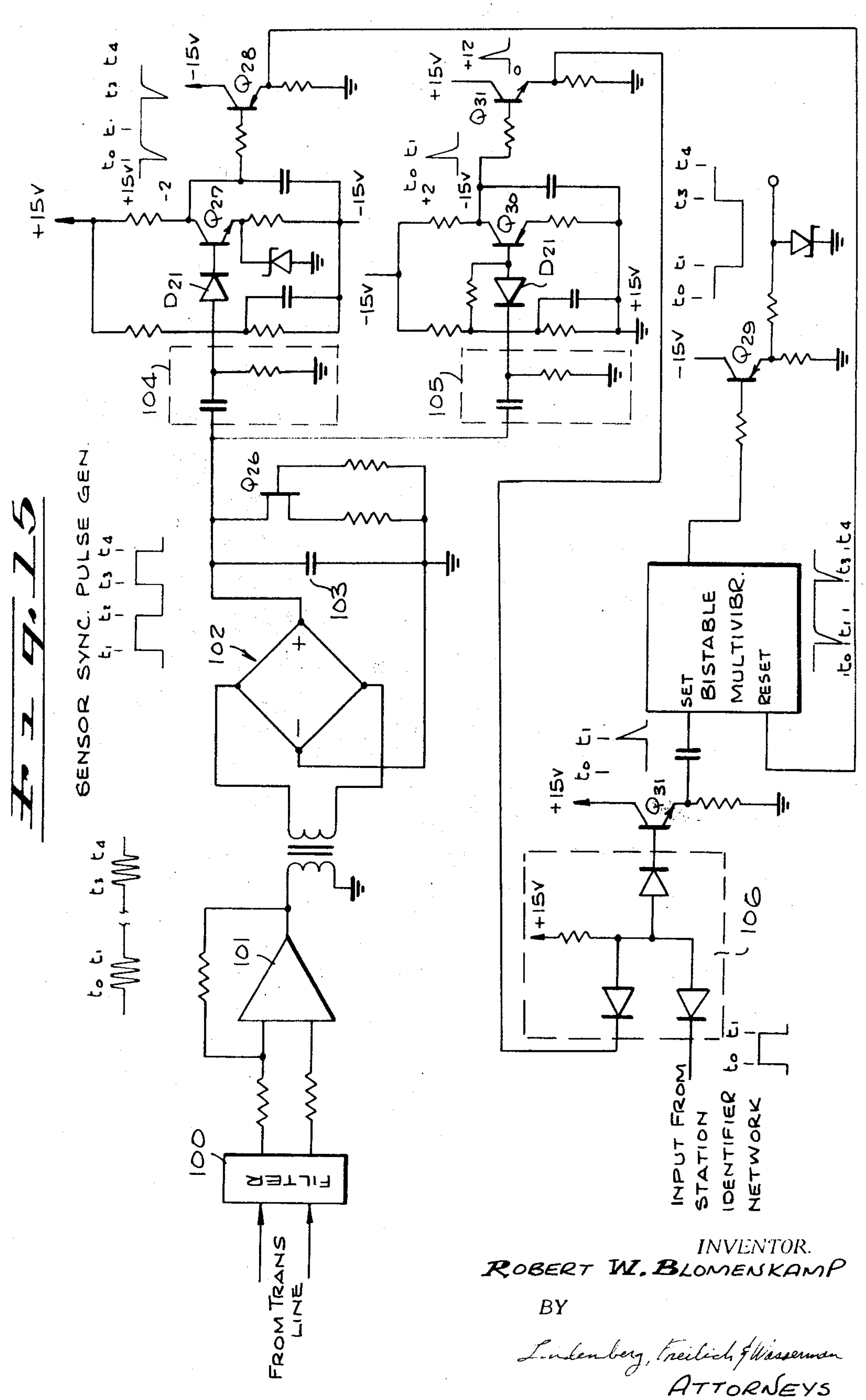
FIG. 15 is a circuit diagram of an alternative pulse generator for the integrator of FIG. 5.

Referring first to the timing diagram of FIG. 15, at time to a programmer in the control unit 31 (FIG. 3) activates the call-up oscillator network 32 for a preset time, typically 0.2 sec. as shown. That network provides a unique tone addressing a remote sensor station. In the event a plurality of tones are employed to address remote sensor station, as suggested hereinbefore, the network provides a unique combination of tones to address one station. When additional stations are to be serviced, the network may include means for sequencing through the address tones to service a different station each time it is activated. Alternatively, the control unit 31 may be programmed to select the tone, or plurality of tones.

At the same time the call-up oscillator network 32 is activated, the control unit 31 closes a relay to connect the network to a line driver similar to the driver of the remote sensor station shown in FIG. 8. This allows the address tone to be transmitted to all of the remote sensor stations on the transmission line.

In practice, the call-up oscillator may be a tone generator similar to the sensor tone generator 23 (FIG. 7) with switching means for stepping from one fixed resistor to another, where the resistors are selected to tune the oscillator to the respective address tones of the remote sensor stations. For example, if 10 remote sensor stations are to be accommodated, a 10 position stepping switch is provided with the movable arm of the switch connected to the oscillator and the 10 contacts of the stepping switch connected to 10 different resistors. The output of the oscillator would be coupled to the line driver by an isolating amplifier just as for the sensor tone generator 23. In some systems it may be desireable to record these address tones on a magnetic tape machine that is activated and deactivated by the programmer so that the predetermined sequence of addressing the stations may be easily changed.

Also at time $t_o$ the central control unit 31 selects proper filters 74 and 75 (FIG. 10) for the unique remote sensor station being addressed. After filters would be selected for addressing a different station. The address tone is passed by the filter 74, amplified by an amplifier 76, rectified by a diode bridge 77 and filtered by a capacitor 78. The positive end of the filter is connected to the base of a transistor $Q_{20}$ to produce a positive pulse at its emitter. When the call-up tone ends, the transistor $Q_{20}$ is turned off and the capacitor 78 is discharged, thus terminating the positive pulse in a manner described with reference to FIG. 4 for the station identification circuit 26.

The leading edge of the positive pulse from the transistor $Q_{20}$ triggers a monostable multivibrator 79 the RC timing period of which is set to be approximately 0.1 sec. longer than the time necessary to receive a station identifying signal following data from the remote station addressed. Assuming one second is allotted to the transmission of data by the remote station, and 0.2 sec. is allotted for the station identifying signal that follows, the RC timing period of the multivibrator 79 is set for 1.5 seconds. That is shown in the timing graph B of FIG. 14 as timing period 2. Timing period 1 is the time for transmitting the address tone as shown in the action graph A of FIG. 14.

An emitter-follower transistor $Q_{21}$ is turned on by the multivibrator 79 for the period from approximately $t_o$ to $t_5$ to produce a positive signal which back biases a diode $D_{11}$ of an AND gate comprised of diodes $D_{11}$ to $D_{13}$. This arms the AND gate so that when the proper station identifying signal is received from the addressed station during the period from $t_3$ to $t_4$ (FIG. 14), and the diode $D_{12}$ is also back biased, the AND gate transmits a signal indicating that the station addressed has responded.

While the station identifying signal is received via the filter 75 and amplifier 80, a diode bridge 81 rectifies the signal and a capacitor 82 filters the rectified signal to cause a transistor $Q_{22}$ to produce a positive pulse. That pulse back biases the diode $D_{12}$ thus indicating the proper station identifying ignal has been received. The signal transmitted by the AND gate triggers a monostable multivibrator 82.

Figures 11, 12, 13:
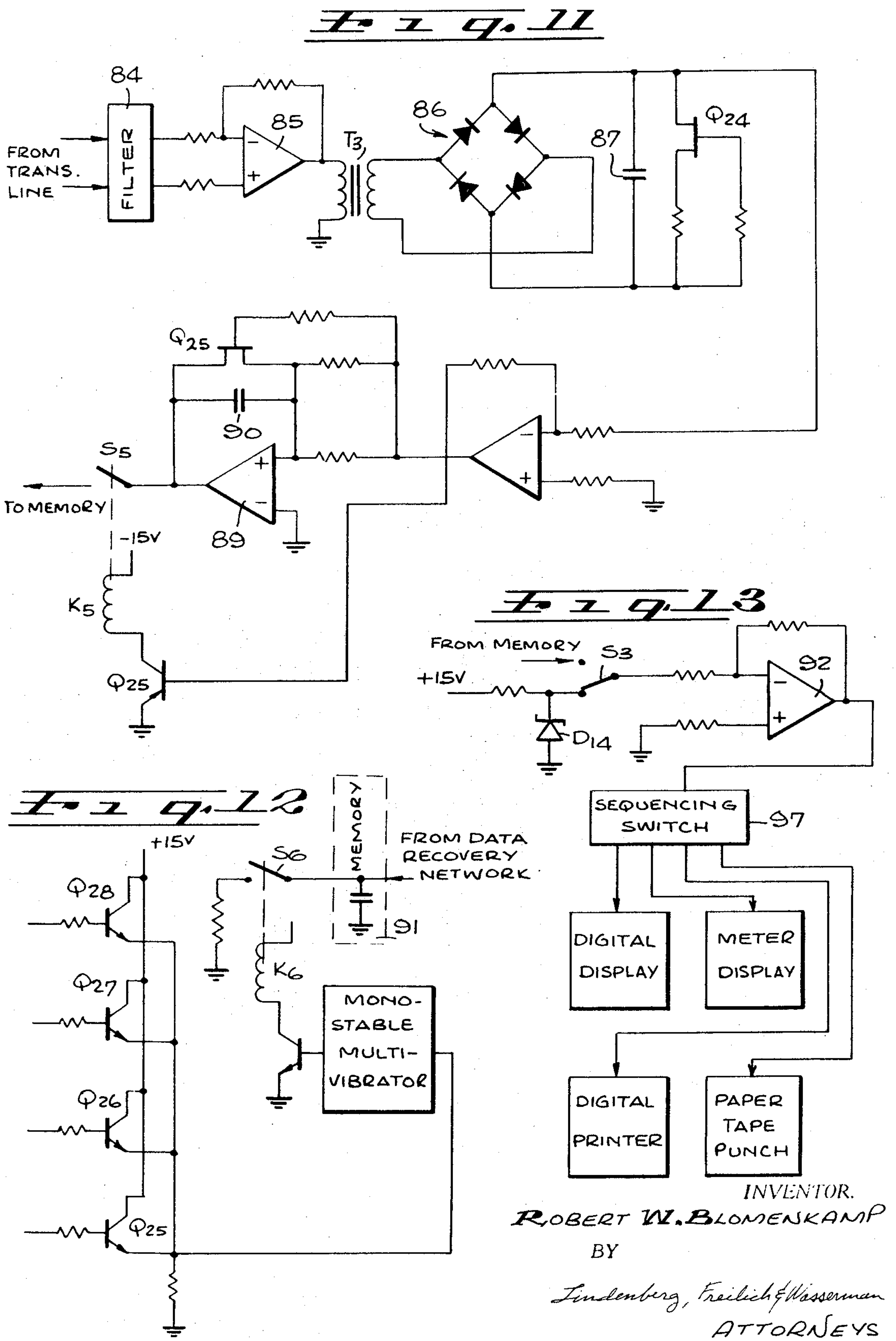
FIG. 11 is a circuit diagram of data-recovery network for control central.
FIG. 12 is a circuit diagram of a buffer memory and dump circuit for control central.
FIG. 13 is a circuit diagram of a data-isolation amplifier and a data-conversion network for control central.
Figure 10:
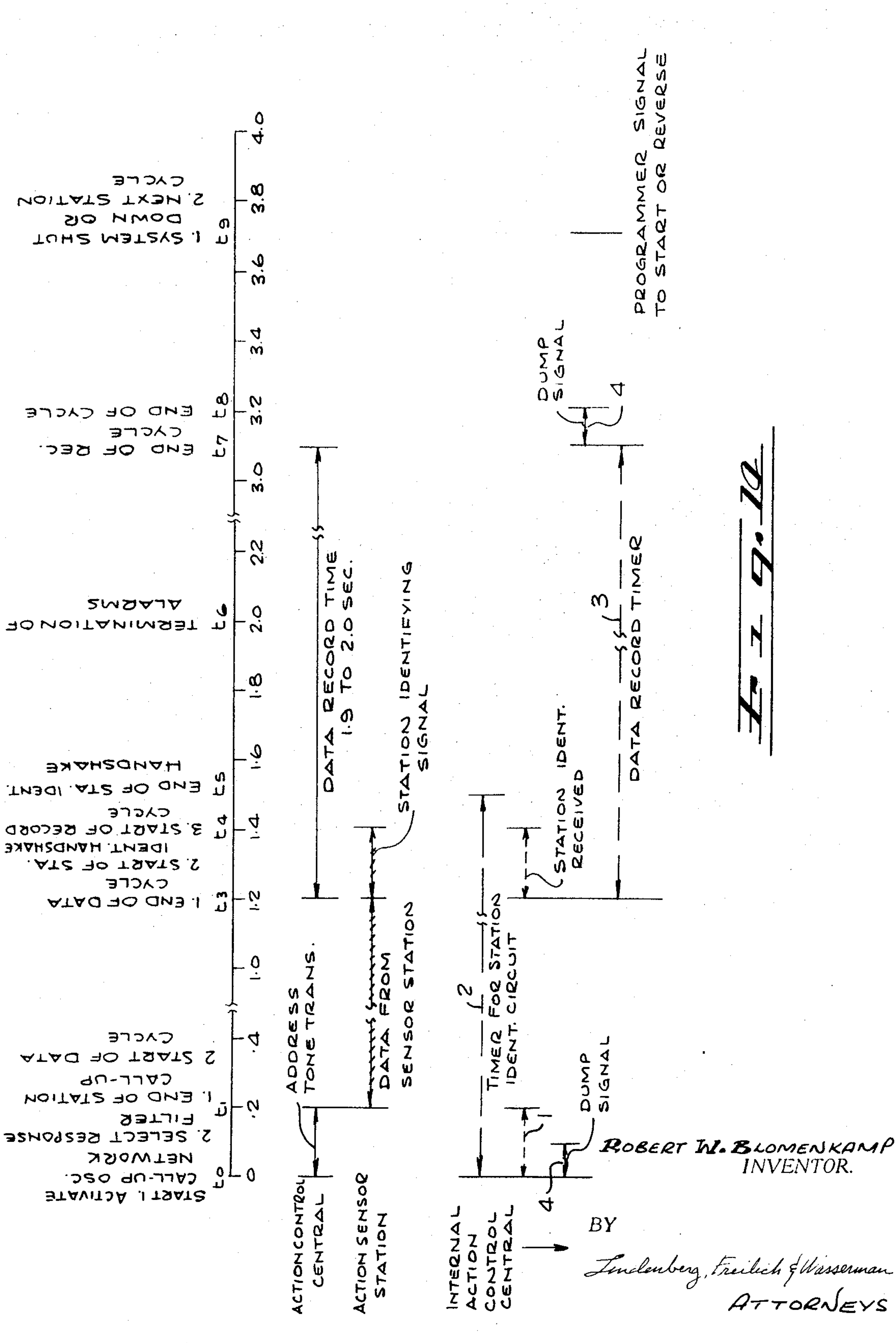

The period of the multivibrator 82 is set to be longer by a few milliseconds than the time required to reformat and transfer all to remote indicating and recording station the data received from the remote sensor station and stored in the buffer memory 35 (FIG. 3). That period is shown in graph B of FIG. 14 as the period 3 from time $t_3$ to time $t_7$. The output of the multivibrator 82 turns a transistor $Q_{23}$ on to energize a relay $K_4$ to close a switch $S_4$ (FIG. 13). This sequence of events validates the data from the remote sensor station addressed. Thus any data received is not transferred to remote recording and indicating stations unless it is from the remote sensor station addressed.

From the foregoing it is evident that from time $t_1$ to time $t_3$ (FIG. 14), the remote sensor station is transmitting analog sensor data to control central in the form of duration-modulated, frequency-multiplexed tone pulses. These tone pulses are received by control central through a telephone line termination transformer (not shown) and coupled to a bank of filters such as a filter 84 of the data recovery network 33 (FIG. 3) shown in FIG. 11. That network performs the demultiplexing function since there is one filter (and associated circuits as shown for filter 84) for each sensor tone. Thus there is one data recovery network for each sensor at the remote station. These networks operate in parallel for simultaneous demultiplexing and demodulating. The demultiplexing is carried out by the filters, and the demodulating is carried out by the circuits which follow the filters.

The output of the filter 84 is amplified by an isolating amplifier 85 and rectified by a diode bridge 86. A filter capacitor 87, transistor 24 and an inverting, high-gain operational amplifier 88 produce a pulse of fixed amplitude from the beginning to the end of the sensor tone burst. The fixed amplitude is set by setting the gain of the amplifier 88 such that it drives the output to a saturation level $V_s$ with the lowest possible amplitude of received signal from the output of the filter 84. This saturation level is tightly controlled by a dual tracking regulated power supply, and the offset voltage of the amplifier is compensated to reduce it to substantially zero.

The unique combination of the circuit elements 84 and 87, including the field-effect transistor $Q_{24}$ is the same in organization and operation as the station ID circuit of FIG. 9 and provides at the output of the amplifier 88 a well defined negative square wave of controlled amplitude the period of which is established by the time duration of the sensor tone burst. This negative square wave is coupled to the base of a transistor $Q_{25}$ which is then turned on to energize a relay $K_5$. That relay closes a switch $S_5$ to couple the output of an operational amplifier 89 to the buffer memory and dump circuit of FIG. 12 during the time a sensor tone is being received. The operational amplifier 89 and feedback capacitor 90 integrate the demultiplexed and detected tone burst to demodulate it, i.e., to convert it back into signal amplitude from tone burst duration. At the trailing edge of the square wave output of amplifier 88, the relay $K_5$ is de-energized and the capacitor 90 is automatically discharged by a field-effect transistor $Q_{25}$.

The buffer memory which receives the demultiplexed and demodulated signal is comprised of a bank of capacitors, such as a capacitor 91 shown in FIG. 12 for the one data recovery network shown in FIG. 11. There would be one capacitor for each network operating in parallel. The capacitor charges in parallel with the feedback capacitor 90 of the network, and stores the analog signal until time $t_7$ (FIG. 14), at which time it is dumped.

When the station I.D. network 37 (FIG. 10) verifies that the proper remote sensor station has responded, and relay $K_4$ is energized, switch $S_4$ is activated to connect the memory capacitor 91 to the input of an isolation amplifier 92 shown in FIG. 13, having a differential input stage comprised of field-effect transistors (preferably of the MOS type) to present a high input impedance on the order of $1 \times 10''$ ohms for an RC time constant of the memory capacitor 91 and isolation amplifier 92 of at least $2 \times 10^7$ seconds. In that manner the analog signal stored in the buffer memory will remain substantially constant after the relay $K_4$ has been de-energized at time $t_3$, and throughout the data transfer period from time $t_3$ to time $t_7$.

The isolation amplifier 92 is connected to recording and indicating devices 93 to 96 by a sequencing switch 97. In that manner the content of the buffer memory is transferred as the sequencing switch connects isolation amplifiers associated with the various memory capacitors in sequence. Operation of the sequencing switch may be automatic or under control of the control unit 31, FIG. 3. Additional switches may be provided to selectively connect various ones of the devices 93 to 96 under control of the control unit. In addition to the recording and indicating devices, the sequencing switch may be connected to a data processor, which in turn may restransmit the data to a remote readout station as described with reference to FIG. 1.

When the relay $K_4$ is de-energized, the switch $S_4$ couples a calibration reference signal from a Zener diode $D_{14}$ to the amplifier 92. In that manner a calibration signal is provided during the non-data recording and indicating time for calibration as required by the user of the system.

The buffer memory 35 includes a dump circuit comprised of a relay $K_6$ energized for 0.1 sec. after time $t_7$ by a monostable multivibrator 98. That dump period is shown in FIG. 14 is period 4 beginning at time $t_7$, but there is also a dump period 4 starting at time $t_o$ initiated by triggering the multivibrator 98 via transistor $Q_{25}$ by the output of transistor $Q_{20}$ (FIG. 10) which triggers the multivibrator 79 to initiate the station identification period 2 (FIG. 14), and via a transistor $Q_{26}$ by the output of transistor $Q_{23}$ (FIG. 10) which energizes the relay $K_4$. In the latter case the triggering occurs at the trailing edge, i.e., at the end of the period of the multivibrator 82 owing to the inversion of the signal by the transistor $Q_{23}$. It should be noted that there is only one station I.D. timer in the central control, but that there are a number of station I.D. networks, one for each remote station. Accordingly, additional transistors, such as transistors $Q_{27}$ and $Q_{28}$ are provided. However, it would be possible to use the same monostable multivibrator 82 for all station I.D. networks by using an OR gate to connect the AND gates to the transistors $Q_{23}$, i.e., by connecting the AND gates comprised of diodes $D_{11}$ to $D_{13}$ of each station I.D. network to the base of the single transistor $Q_{23}$. The diodes $D_{13}$ of the gates would perform the OR function referred to while the diodes $D_{11}$ and $D_{12}$ perform the AND function in each gate. The one transistor $Q_{26}$ in the dump circuit would thus accommodate all of the station I.D. networks.

Referring now to FIG. 15, an alternative generator for the square wave applied to integrators in a remote station is comprised of a filter 100 tuned to pass synchronizing tone bursts in one of the M frequency bands. An amplifier 101, diode bridge 102, filter capacitor 103 and transistor $Q_{26}$ produce square wave pulses from the synchronizing tone bursts in the same manner as the station I.D. circuit (FIG. 4) produces a pulse from the address tone burst. The first synchronizing tone burst is transmitted by the control central from time $t_o$ to time $t_1$ while the address tone burst is being transmitted. The pulse produced from it is differentiated by an RC circuit 104 to produce a sharp positive pulse at the leading edge, and a sharp negative pulse at the trailing edge. Only the positive pulse is passed by a diode $D_{20}$ and inverted by an amplifier comprised of a transistor $Q_{27}$. A transistor $Q_{28}$ connected as an emitter follower couples the negative pulse thus produced from the leading edge of the first synchronizing tone burst at time $t_o$ to reset terminal of an RS flip-flop 105. However, the flip-flop will normally already be in the reset state so that its false (*o*) output terminal will produce a steady *o*-volt signal through a transistor $Q_{29}$ connected as an emitter follower.

The pulse produced from the first synchronizing tone burst is similarly differentiated by an RC circuit 105 to produce sharp positive and negative pulses. A diode $D_{21}$ is poled to pass only the negative pulse occurring at time $t_1$. A transistor $Q_{30}$ amplifies and inverts that negative pulse, and a transistor $Q_{31}$ connected as an emitter follower applies the resultant positive pulse to one input of a diode AND gate 106. The other input to the diode AND gate is connected to receive the pulse produced from the station address tone burst by the station I.D. circuit (FIG. 4). The coincidence of signals at the two input terminals sets the flip-flop 105 via a transistor $Q_{31}$, thus driving the transistor $Q_{29}$ on to produce a negative square wave signal transmitted to tone generator switches and the time driver until the flip-flop is set by the negative pulse produced through transistor $Q_{27}$ from the leading edge of the second synchronizing tone burst at time $t_3$. The result is a data period pulse generated from time $t_1$ to time $t_3$ under direct control of control central.

This circuit of FIG. 15 can be substituted for the pulse generator circuit 27 of FIG. 5 by omitting the capacitor 45 and connecting the station I.D. circuit directly to the second input terminal of the diode AND gate 106, and connecting the filter 100 directly to the transmission line. The data period of the remote sensor station being addressed may thus be controlled directly by the control central where the period from time $t_3$ to time $t_4$ may be varied, if desired, as the remote sensor stations are addressed, i.e., as the address sequence skips from one station to another.

Although the present invention has been described in connection with a particular exemplary embodiment, it is to be understood that additional embodiments and modifications will be obvious to those skilled in the art. Consequently, it is intended that the claims be interpreted to cover such embodiments and modifications.

What is claimed is:

1. In a system for transmission of analog data over a single transmission channel from sensors at one of a plurality of remote stations to a central station, the combination of means for transmitting an address signal from said central station to all of said remote stations to select a single one of said remote stations for acquiring analog data from sensors at said remote station, and initiate therein a data period, control means at an addressed station responsive to said address signal for initiating at the beginning of said data period transmission over said channel of a plurality of distinct tones associated with station sensors, one tone associated with each station sensor, and for simultaneously initiating a ramp signal, and means for terminating transmission of separate ones of said sensor tones when said ramp signal is equal to analog signals from associated sensors, whereby amplitude to tone duration conversion is accomplished for a plurality of analog sensors simultaneously.

2. The combination of claim 1 including means for terminating transmissions of all sensor tones not already terminated after said data period.

3. The combination of claim 2 including separate means at each remote station for transmitting at the end of said data period a station identifying tone over said channel thereby indicating to said central station that the addressed remote station has responded.

4. The combination of claim 3 wherein said control means at each station includes separate means for generating a distinct tone for each sensor, and separate switching means for simultaneously coupling each tone generating means to said common transmission channel at the beginning of said data period and symultaneously initiating said ramp signal.

5. The combination of claim 4 wherein said means for terminating transmission of separte ones of said sensor tones includes a separate means for comparing said ramp signal with a unique one of said analog sensor signals, and for producing a unique signal when said ramp signal is equal to the analog sensor signal being compared, and means responsive to each unique comparator signal for terminating transmission from an associated tone generating means over said transmission channel.

6. The combination of claim 5 wherein said station identifying means comprises means at each of said remote stations for generating a unique tone signal, and means for coupling said station identifying tone generating means to said transmission channel for a predetermined period at the end of said data period.

7. The combination of claim 6 including means at control central for receiving and separating said sensor tones transmitted over said channel into separate receiving channels, each receiving channel including means for demodulating the sensor tone therein to provide a received signal of a predetermined amplitude and a duration proportional to an original sensor signal, and means for integrating said received signal, thereby producing at an output terminal of said integrating means an analog output signal having an amplitude proportional to said original sensor signal.

8. In a system for transmission of analog data from sensors at remote stations to a control central station, each remote sensor station having a plurality of sensors, the combination of a transmission channel connecting said remote stations to said control central station, means for transmitting an address signal from said control central station to all of said remote sensor stations over said transmission channel to select a single one of said remote sensor stations for acquiring analog data from said sensor at said remote sensor station, control means at each remote sensor station responsive to said address signal for initiating transmission over said channel of a plurality of distinct tone associated with station sensors, one tone associated with each station sensor, and for simultaneously initiating a ramp signal, means for terminating transmission of separate tones associated with said sensors when said ramp signal is equal to analog signals from said associated sensors, whereby conversion of amplitude to frequency burst duration of a tone is accomplished for a plurality of analog sensors while simultaneously transmitting said plurality of said tones as frequency-division multiplexed signals, means at control central for receiving and demultiplexing said frequency-division multiplex signals into a plurality of duration modulated tone signals, means at control central for demodulating each of said duration modulated tone signals to provide a received signal proportional to an original sensor analog signal, and means at control central for temporarily storing said received signals.

9. The combination of claim 8 including separate means at each remote sensor station for transmitting over said channel a station identifying signal for a predetermined period after transmission from all sensor tone generating means has been terminated, thereby indicating to the control central that the addressed remote sensor station has responded.

10. The combination of claim 8 wherein said control means at each remote sensor station includes station identification means responsive to said address signal from said central station for producing a station activating pulse, separate means for generating a distinct tone for each sensor, and, separate switching means for simultaneously coupling each tone generating means to said common transmission channel and initiating said ramp signal in response to said remote sensor station activating pulse.

11. The combination of claim 10 wherein said means for terminating transmission of separate ones of said sensor tones includes a separate comparator means for comparing said ramp signal with each analog sensor signal, and for producing a unique signal when said ramp signal is equal to said analog signal, means for coupling said unique signal from each of said separate comparator means to distinct ones of said switching means, a unique signal from a given comparator means of an analog signal from one of said sensors being coupled to a switching means for an associated tone, and separate means within each switching means responsive to a unique signal coupled from a comparator means for decoupling an associated tone generating means from said common transmission channel, thereby producing frequency-burst-duration modulated and frequency-division multiplexed signals.

12. The combination of claim 11 including separate means for generating a station identifying tone at each remote sensor station, and means for coupling said station identifying tone generating means to said common transmission channel for a predetermined period after all sensor tone generating means have been decoupled from said transmission channel, thereby indicating to the control central that the addressed remote station has responded.

13. The combination of claim 8 wherein said demultiplexing means is comprised of separate means for band pass filtering each of the specific frequencies of tones of a given remote sensor station transmitted over said channel, and said demodulating means for a given filtered tone, which has been duration modulated by an analog sensor signal, is comprised of means for rectifying said given tone signal, a capacitor for filtering the output of said rectifying means, amplifying means for producing an output signal of predetermined amplitude when a minimum charge is stored in said capacitor, means for rapidly discharging filter capacitor to below said minimum to terminate said output signal when said given tone signal terminates, and means for integrating said output signal, thereby producing at an output terminal of said integrating means an analog output signal having an amplitude proportional to the duration of said given tone signal.

14. The combination of claim 13 including a memory capacitor, switching means for connecting said output terminal of said integrating means to said memory capacitor, thereby charging said memory capacitor to the level of said analog output signal, in response to said output signal from said amplifying means.

15. The combination of claim 13 wherein said means for discharging said filter capacitor includes a field-effect transistor having a source, a drain and a gate connected with its source-drain circuit in parallel with said capacitor, said source being connected to one side of said capacitor, and said gate and drain being connected to the other side of said capacitor, where said one side is selected of a polarity which provides a high source-to-gate voltage to bias source-drain circuit current off when said capacitor is charged.

16. The combination of claim 15 wherein said drain is connected to said capacitor by a resistor.

17. The combination of claim 16 wherein said field-effect transistor is of the junction type and said gate is connected to said capacitor by a resistor.

* * * * *

UNITED STATES PATENT OFFICE
CERTIFICATE OF CORRECTION

Patent No. 3,754,215 Dated August 21, 1973

Inventor(s) Robert W. Blomenkamp

It is certified that error appears in the above-identified patent and that said Letters Patent are hereby corrected as shown below:

| | |
|---|---|
| Column 2, Line 2 | Delete the comma (,) after "proportional" |
| Column 3, Line 38 | "occuring" should read --occurring-- |
| Column 3, Line 40 | Insert --cycle-- after "transmissic |
| Column 6, Line 45 | Insert --27-- after "generator" |
| Column 6, Line 46 | Insert --30-- after "circuit" |
| Column 6, Line 64 | Insert --27-- after "generator" |
| Column 7, Line 59 | "idicates" should read --indicates-- |
| Column 8, Line 23 | "deVices" should read --devices-- |
| Column 8, Line 26 | "deScribed" should read --described-- |
| Column 8, Line 42 | Insert --the capacitor 43-- after "for |

UNITED STATES PATENT OFFICE

CERTIFICATE OF CORRECTION

Patent No. 3,754,215 Dated August 21, 1973

Inventor(s) Robert W. Blomenkamp

It is certified that error appears in the above-identified patent and that said Letters Patent are hereby corrected as shown below:

| | |
|---|---|
| Column 10, Line 15 | Insert --the-- after "of" |
| Column 10, Line 55 | "15" should read --14-- |
| Column 10, Line 56 | "to" should read --$t_0$-- |
| Column 11, Line 26 | "After" should read --Other-- |
| Column 11, Line 67 | "ignal" should read --signal-- |
| Column 11, Line 65 | "82" should read --83-- |
| Column 12, Lines 1 and 8 | "82" should read --83-- |
| Column 12, Line 33 | "24" should read --$Q_{24}$-- |

FORM PO-1050 (10-69)

USCOMM-DC 60376-P69
© U.S. GOVERNMENT PRINTING OFFICE : 1969 O—366-334.

UNITED STATES PATENT OFFICE
CERTIFICATE OF CORRECTION

Patent No. 3,754,215 Dated August 21, 1973

Inventor(s) Robert W. Blomenkamp

It is certified that error appears in the above-identified patent and that said Letters Patent are hereby corrected as shown below:

| | |
|---|---|
| Column 12, Line 61 | "$Q_{25}$" should read --$Q_{26}$-- |
| Column 12, Line 62 | Insert --35 (Fig. 3)-- after "memory" |
| Column 13, Line 38 | Insert --(Fig. 3)-- after "35" |
| Column 13, Line 40 | Insert --(Fig. 12)-- after "98" |
| Column 13, Line 43 | "$Q_{25}$" should read --$Q_{27}$-- |
| Column 13, Line 46 | "$Q_{26}$" should read --$Q_{28}$-- |
| Column 13, Line 55 | "$Q_{27}$ and $Q_{28}$" should read --$Q_{29}$ and $Q_{30}$-- |
| Column 13, Line 64 | "$Q_{26}$" should read --$Q_{27}$-- |
| Column 14, Line 4 | "Q26" should read --Q32-- |
| Column 14, Line 15 | "$Q_{27}$" should read --$Q_{33}$-- |
| Column 14, Line 15 | "$Q_{28}$" should read --$Q_{34}$-- |
| Column 14, Line 18 | Insert --a-- after "to" |
| Column 14, Line 18 | "105" should read --$FF_1$-- |

USCOMM-DC 60376-P69
☆ U.S. GOVERNMENT PRINTING OFFICE 1969 O—366-334

UNITED STATES PATENT OFFICE
CERTIFICATE OF CORRECTION

Patent No. 3,754,215 Dated August 21, 1973

Inventor(s) Robert W. Blomenkamp

It is certified that error appears in the above-identified patent and that said Letters Patent are hereby corrected as shown below:

| | |
|---|---|
| Column 14, Line 20 | "(o)" should read --$\overline{Q}$-- |
| Column 14, Line 21 | "$Q_{29}$" should read --$Q_{35}$-- |
| Column 14, Line 27 | "$Q_{30}$" should read --$Q_{36}$-- |
| Column 14, Line 28 | "$Q_{31}$" should read --$Q_{37}$-- |
| Column 14, Line 34 | "105" should read --$FF_1$-- |
| Column 14, Line 35 | "$Q_{31}$" should read --$Q_{38}$-- |
| Column 14, Line 35 | "$Q_{29}$" should read --$Q_{35}$-- |
| Column 14, Line 38 | "set" should read --reset-- |
| Column 14, Line 39 | "$Q_{27}$" should read --$Q_{34}$-- |
| Column 16, Line 22 | "multiplex" should read --multiplexed |
| Column 17, Lines 14 and 15 | "band pass" should read --bandpass-- |
| Column 17, Line 26 | Insert --said-- after "discharging" |

FORM PO-1050 (10-69)

USCOMM-DC 60376-P
U.S. GOVERNMENT PRINTING OFFICE : 1969 O—366-3

UNITED STATES PATENT OFFICE

CERTIFICATE OF CORRECTION

Patent No. 3,754,215 Dated August 21, 1973

Inventor(s) Robert W. Blomenkamp

It is certified that error appears in the above-identified patent and that said Letters Patent are hereby corrected as shown below:

Figure 3 - Add the reference numeral 37 to the block bearing the legend DATA ISOLATION & CONVERTER UNIT Figure 9 - Add the reference numeral 71 to the block bearing the legened TONE OSC.

Figure 10:
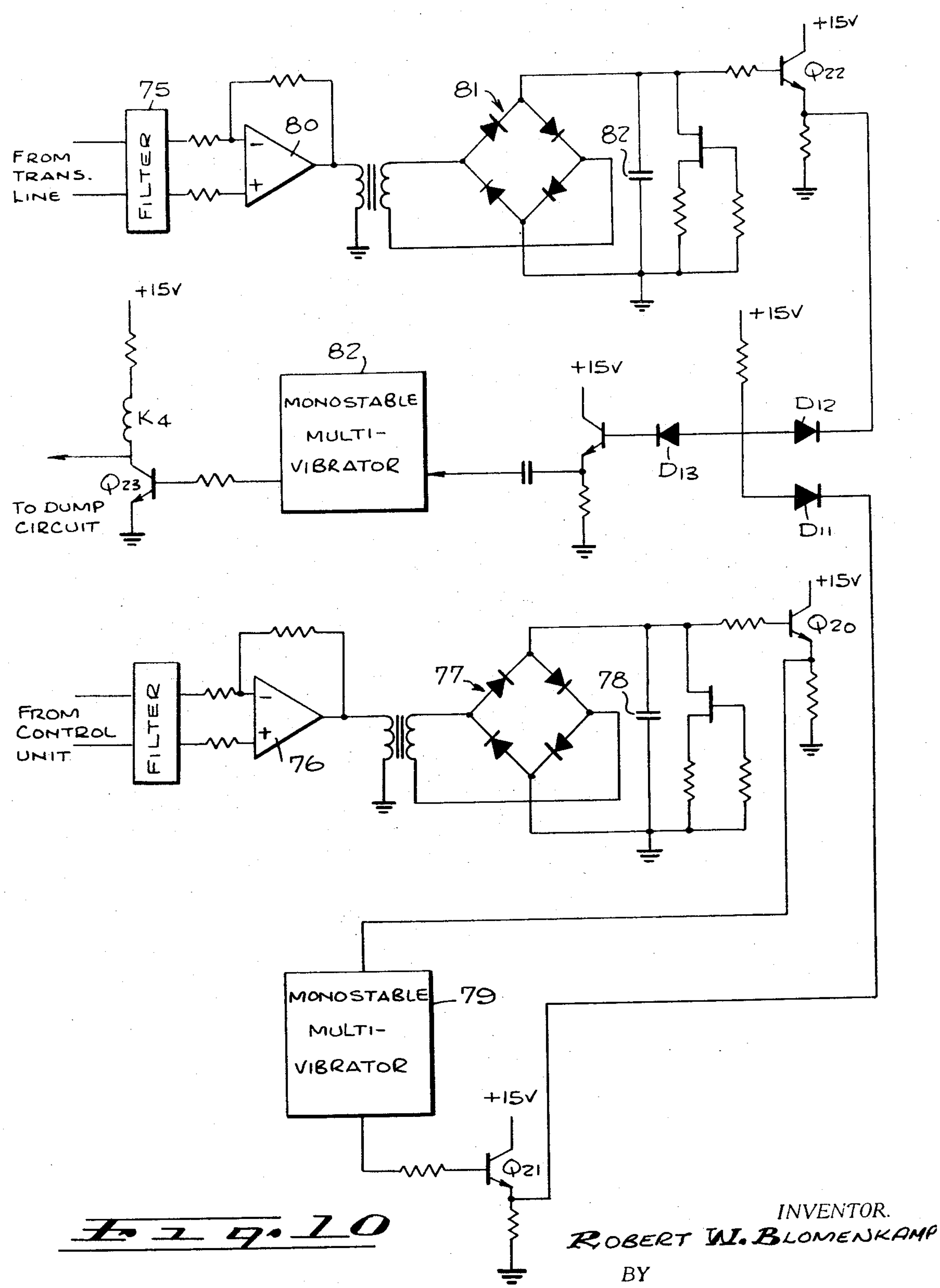
FIG. 10 is a circuit diagram of a station-identifying network and timer for control central.

Figure 10 - Change the reference numeral 82 for the block beari the legend MONOSTABLE MULTIVIBRATOR to the referenc numeral 83, add a reference numeral 74 to the bl bearing the legend FILTER ahead of the amplifier /( and add a dot at the junction between diodes $D_{11}$ $D_{13}$.

Figure 11 - Change the reference character $Q_{25}$ of the transist( across the amplifier 89 to the reference character $Q_{26}$; add the reference numeral 88 to the amplifier feeding into the amplifier 89, and add a dot to the junction between the output terminal of the amplifier 88 and its feedback resistor.

UNITED STATES PATENT OFFICE
CERTIFICATE OF CORRECTION

Patent No. 3,754,215 Dated August 21, 1973

Inventor(s) Robert W. Blomenkamp

It is certified that error appears in the above-identified patent and that said Letters Patent are hereby corrected as shown below:

Figure 12 - add the reference numeral 98 to the block bearing the legend MONOSTABLE MULTIVIBRATOR and change the reference characters $Q_{25}$ and $Q_{26}$ of transistors to respective reference characters $Q_{29}$ and $Q_{30}$.

Figure 13 - add the reference numerals 93, 94, 95 and 96 to the blocks bearing the respective legends DIGITAL DISPLAY METER DISPLAY, DIGITAL PRINTER and PAPER TAPE PUNCH.

Figure 15 - change the reference characters of transistors $Q_{26}$ through $Q_{31}$ in the right-hand side of the figure to respective reference characters $Q_{32}$ through $Q_{37}$ connected to the diode AND gate 106 to the reference character $Q_{38}$; change the reference character $D_{21}$ at the upper right-hand corner of the figure to the reference character $D_{20}$; add a dot at the junction between the RC circuit 104 and the diode $D_{20}$, and a dot at the junction between the RC circuit 105 and the diode $D_{21}$; change the legend in the block at the bottom of the figure from SET BISTABLE MULTIVIBRATOR RESET to S and R at input terminals on the left, add Q and $\bar{Q}$ on the right opposite the input terminals, and add the reference character $FF_1$ in the center; show the connection from the output terminal $\bar{Q}$ of the block to the transistor $Q_{35}$; and clarify the timing waveform shown below the block to indicate a negative pulse at the R-input terminal of that block at time $t_0$ and again at time $t_3$ on a scale of about 1/4 inch per timing period between times $t_0$, $t_1$, $t_2$ and $t_3$.

Signed and sealed this 29th day of October 1974.

(SEAL)
Attest:

McCOY M. GIBSON JR.
Attesting Officer

C. MARSHALL DANN
Commissioner of Patents

USCOMM-DC 60376-P69
☆ U.S. GOVERNMENT PRINTING OFFICE : 1969 O—366-334